United States Patent [19]

Nouda et al.

[11] 4,294,791

[45] Oct. 13, 1981

[54] PROCESS FOR PRODUCING THERMOPLASTIC RESIN FILM OF MARKEDLY REDUCED THICKNESS UNEVENNESS

[75] Inventors: Hiroshi Nouda, Sagamihara; Yoshiaki Tanihara, Machida; Takashi Ikeda; Ituo Ogiuchi, both of Sagamihara, all of Japan

[73] Assignee: Teijin Limited, Osaka, Japan

[21] Appl. No.: 107,280

[22] Filed: Dec. 26, 1979

[30] Foreign Application Priority Data

Jan. 5, 1979 [JP] Japan ................................. 54/22
Jan. 5, 1979 [JP] Japan ................................. 54/23
Jan. 5, 1979 [JP] Japan ................................. 54/24

[51] Int. Cl.$^3$ .............................................. B29D 7/24
[52] U.S. Cl. ............................. 264/210.2; 264/40.7; 264/216; 264/290.2; 425/135; 425/141; 425/169
[58] Field of Search ................. 264/210.2, 212, 290.2, 264/216, 40.1, 40.7; 425/135, 141, 169

[56] References Cited

U.S. PATENT DOCUMENTS

| | | | |
|---|---|---|---|
| 3,223,757 | 12/1965 | Owens et al. | 264/216 |
| 3,397,263 | 8/1968 | Werner | 264/216 |
| 3,523,987 | 8/1970 | Camhi et al. | 264/216 |
| 3,795,474 | 3/1974 | Heyer | 425/224 |
| 3,890,078 | 6/1975 | Straumanis | 425/141 |
| 3,982,863 | 9/1976 | Latham et al. | 264/40.7 |
| 4,020,141 | 4/1977 | Quinn et al. | 264/212 |
| 4,140,740 | 2/1979 | De Smedt et al. | 264/290.2 |

*Primary Examiner*—Jeffery R. Thurlow
*Attorney, Agent, or Firm*—Sherman & Shalloway

[57] ABSTRACT

A process for producing a film of a thermoplastic resin, characterized in that the rotation of a cooling drum for cooling a molten film-like extrudate is controlled such that the variation rate (%) of instantaneous rotation under no load (as defined in the specification) is less than about 1%, and that the cooled film-like extrudate is withdrawn from the cooling drum so that substantially no tension in the subsequent stretching step is exerted on the film-like extrudate on the cooling drum. The process is preferably applicable to a film-forming apparatus which operates at high speeds. A film having markedly reduced thickness unevenness is produced.

4 Claims, No Drawings

PROCESS FOR PRODUCING THERMOPLASTIC RESIN FILM OF MARKEDLY REDUCED THICKNESS UNEVENNESS

This invention relates to a process for producing a film from a thermoplastic resin. More specifically, it relates to a process for producing a film having markedly reduced thickness unevenness continuously from a thermoplastic resin.

Thermoplastic resin films are consumed commercially in great quantities as base films for photographic materials or magnetic tapes, or as materials for condenser dielectrics. For these applications, the films are required to have a high level of dimensional accuracy in thickness, width, length, etc. The requirement for the uniformity of film thickness is especially strong. Since the uniformity of the thickness of a film is determined during film formation, various attempts have been made heretofore to reduce variations in film thickness. No film-forming technique has been developed as yet which fully meets this requirement.

As far as the present inventors know, all conventional methods for producing films of a uniform thickness involve maintaining a uniform rate of flow of a polymer in time and space in a process ranging from the feeding of the polymer to the casting of a molten polymer extrudate onto the surface of a cooling drum.

For example, in a process leading to the extrusion of polymer from a melt extruder, suggestions have been made heretofore about the size and shape of polymer chips or pellets, the shape of a hopper as a means of feeding the polymer chips or pellets, the shape of a hopper as a means of feeding the polymer chips or pellets into an extruder, the temperature of the feed portion of the extruder, the control of the rotating speed of the extruder screw so as to follow variations in the amount of the polymer extruded, and the shape of the extruder screw. There were also suggested a method which comprises providing a mixer in front of a die of an extruder to knead the molten polymer uniformly and maintain a uniform temperature and a uniform molecular weight distribution of the polymer (see U.s. Pat. Nos. 3,582,045 and 3,800,985) and a method which comprises providing a metering pump in front of a die of an extruder so as to feed the molten polymer at a fixed flow rate (see U.S. Pat. No. 3,755,398).

Various suggestions have also been made about dies of extruders. For example, there was suggested a method in which in order to maintain a uniform flow rate of a molten polymer extruded through a slit die or a circular die in its widthwise or circumferential direction, that portion of the molten polymer flow which has a high (or low) flow rate is locally heated (or cooled) to decrease (or increase) the melt viscosity of the molten polymer (see British Pat. No. 1,390,226 for the flat die, and U.S. Pat. No. 3,751,537 for the circular die). As a variation of such a local temperature control method, it was also suggested to divide the die into a number of small areas in its widthwise or circumferential direction and making these small areas adiabatically independent from each other thereby to permit localized temperature control. (see U.S. Pat. Nos. 3,883,279 and 3,819,775). Furthermore, as another method for maintaining a uniform flow rate of the extruded molten polymer along the die lip, a method was suggested in which a bolt whose pushing pressure is adjustable by thermal expansion is provided in the die to maintain the die lip clearance uniform throughout the entire width of the die (see U.S. Pat. No. 3,940,221).

Improvements and changes have also been made on the method of casting a molten polymer extruded from a die onto a casting drum. They are directed to the prevention of thickness unevenness during the casting onto a casting drum of a molten polymer extruded from a die slit at a fixed flow rate both in regard to time and space. To achieve this end, it is desirable, for example, to form the position of the touchdown of the extruded molten polymer on the casting drum in a straight-line fashion. Techniques for achieving it have been proposed, and include, for example, a method which comprises applying an electrostatic charge to the extruded molten polymer on the casting drum so as to bring the polymer electrostatically into intimate contact with the drum and stabilize its cooling (see U.S. Pat. No. 3,223,757), a method which comprises sucking the extruded molten polymer on the casting drum, or applying a pneumatic pressure to it by an air knife (see U.S. Pat. No. 3,795,474), and a method comprising a combination of the aforesaid electrostatic pinning method with any of the latter methods (see U.S. Pat. No. 3,904,725).

These conventional methods have their own advantages, but are not believed to have been discovered as a result of observing the entire process from the extrusion of a molten thermoplastic resin to stretching and even to heat-treatment with regard to the individual steps of the process or with very strict attention. It cannot be said definitely therefore that these methods are suitable for the preparation of films having a very strictly controlled uniform thickness.

It is an object of this invention therefore to provide an improved process for producing a film having markedly reduced thickness unevenness from a thermoplastic resin.

Another object of this invention is to provide a process for continuously producing a stretched film comprising a series of steps including the extrusion of a molten thermoplastic resin and stretching and at times, even heat-treatment, and particularly an improved process for producing a film having markedly reduced thickness unevenness by strictly controlling a step which ranges from the beginning to the substantial completion of the solidification of the molten thermoplastic resin and in which thickness unevenness is most liable to occur in the film.

Still another object of this invention is to provide an improved process for producing a film having remarkably improved thickness unevenness by using a film-forming apparatus which is operated at high speeds.

Other objects of this invention will become apparent from the following description.

According to this invention, the objects and advantages of the invention are achieved by a process for producing a film of a thermoplastic resin which comprises extruding a molten thermoplastic resin in film form onto a rotating cooling drum through a die slit, cooling the film-like extrudate on the cooling drum, withdrawing the cooled film-like extrudate from the cooling drum, and then stretching it; characterized in that the rotation of the cooling drum is controlled such that the variation rate (%) of instantaneous rotation under no load defined by the following $$\frac{\text{(Maximum instantaneous rotating speed)} - \text{(Minimum instantaneous rotating speed)}}{\text{Average rotating speed}} \times 100$$

is less than about 1%, and that said withdrawal of the cooled film-like extrudate is carried out so that substantially no tension in the subsequent stretching step is exerted on the film-like extrudate on the cooling drum.

The characteristic feature of the process of this invention is that the cooling drum is rotated at a very strictly controlled rotating speed, and that no tension in the stretching step is exerted on the film-like extrudate on the cooling drum which is rotating in this manner.

The very strictly controlled rotating speed in the process of this invention means such a rotating speed that the variation rate (%) of instantaneous rotation under no load defined by the following $$\frac{\text{(Maximum instantaneous rotating speed)} - \text{(Minimum instantaneous rotating speed)}}{\text{Average rotating speed}} \times 100$$

is less than about 1%.

For example, when a cooling drum having a diameter of 634 mm is rotating at a peripheral speed of 20 m/min., the peripheral moving distance within a period of as short as 0.1 second is about 3.3 cm which corresponds to a rotating angle of about 6°. The variation rate of instantaneous rotation under no load under the above conditions means that the difference between the maximum instantaneous rotating speed and the minimum instantaneous rotating speed is about 0.06°, and in other words, the difference between the maximum instantaneous peripheral moving distance and the minimum instantaneous peripheral moving distance is 0.33 mm.

Evidently, the strictly controlled rotating speed in the process of this invention cannot be achieved by driving methods for conventional cooling drums, for example by a driving method using a gear mechanism.

In the process of this invention, a motor whose rotation can be precisely controlled can, for example, be used preferably as means for adjusting the variation rate of instantaneous rotation under no load to less than 1%. In the process of this invention, such a motor is used directly connected to the cooling drum. If desired, this connection is accomplished through a decelerator not equipped with a gear mechanism and a belt transmitting rotation by frictional force without substantial slippage.

The variation rate (%) of instantaneous rotation under no load in the process of this invention means the variation rate (%) of instantaneous rotation when no load is exerted on the cooling drum, i.e. when no molten polymer is exerted on the cooling drum, for example within a period of less than 0.1 second, preferably less than 0.01 second, especially 0.001 second.

The variation rate of rotation in the process of this invention can be measured by detecting an electrical signal corresponding to the speed of the rotating axis or the peripheral speed of the rotating drum by a Brown tube oscilloscope or electromagnetic oscillograph which is an indicating-recording device having a fast response.

A conventional combination of a tachometer and a digital counter can only indicate an average rotating speed within a relatively long time period of 0.1 to 1 second, and cannot be used to measure the variation rate of instantaneous rotation in the process of this invention.

The film-like extrudate on the cooling drum whose rotation is very strictly controlled as shown above is cooled there, and then subjected to a stretching step. It is essential that no tension in the stretching step be exerted on the film-like extrudate on the cooling drum.

If tension in the stretching step is exerted on the film-like extrudate on the cooling drum which is being cooled, it will result in variations in the withdrawing tension of the unstretched film withdrawn from the cooling drum. This variation, in turn, may cause a variation in the rotating speed of the cooling drum. Furthermore, the variation in the speed of withdrawal may cause intermittent slight stretching of the unstretched film.

In order to withdraw the film-like extrudate from the cooling drum so that no tension in the subsequent stretching step is exerted on the film-like extrudate on the cooling drum, it is appropriate to provide loosening in the unstretched film between the cooling step on the cooling drum and the stretching step, or to provide at least two free rolls and at least one dancer roll and pass the unstretched film between these rolls, or to provide nip rolls held at a constant speed and nip the unstretched film therebetween. These methods make it possible to advantageously shut off the variation in tension between the cooling step and the stretching step.

In the method which involves providing loosening in the film, the degree of loosening is desirably increased as the speed of running of the film in the stretching step increases. It is not necessary to provide too great loosening. Generally, as the loosening becomes greater, the film tends more to run zig-zag. When such a tendency is likely to occur, the zigzag running of the film can be prevented by providing a known means such as a sliding guide, a rotary guide, or a device for detecting the end position of the film by a photoelectric detector and thereby changing the angle of the roll axis.

In the method using free rolls and dancer roll, the unstretched film passes over a first free roll and a dancer roll, then a second free roll, and if desired another dancer roll.

The dancer roll used in this invention may be of a known structure in which the axis of the dancer roll moves along a certain track (generally an up-and-down movement or arcuate movement). A weight or air cylinder may be used to apply a load to the dancer roll. The purpose of using at least two free rolls is to regulate the position of feeding the film to the dancer roll, and also to absorb a variation in tension of a short period by utilizing the rotational resistance of the free rolls.

If desired, it is possible to provide a means for increasing or decreasing the rotational resistance of the free rolls, or a flywheel.

It has previously been known to detect the position (amount of movement) of the dancer roll, and based on the result, automatically control the amount of resin fed (extruded) or the rotating speed of the cooling drum on the stock-feeding side and also other operating conditions such as the speed of stretching, the speed of the stenter (stretching in the widthwise direction), and the conditions for heat-treatment and take-up. In the present invention, such an automatic control is quite unnecessary on the stock-feeding side, and as long as the cooling drum rotates at a constant speed, the occurrence of thickness unevenness of film can be prevented.

In the method using nip rolls kept at a fixed speed, at least one pair of nip rolls whose peripheral speed is kept at a fixed speed are used. The control of the peripheral speed is desirably performed by using a brake torque. By the driving force and braking force of the nip rolls, the nip rolls can be kept rotating at a fixed speed in resistance to the variations of tension and speed in the stretching step.

If desired, a free roll or a flywheel-equipped free roll may also be provided in addition to the nip rolls in order to strengthen the controlling effect on variations of a short period.

In the process of this invention any thermoplastic resin can be used which is film-forming and can be stretched. Examples include polyolefins such as polyethylene and polypropylene, polyamides such as polyhexamethylene adipamide and poly-epsilon-caprolactam, and polyesters such as polyethylene terephthalate and polytetramethylene terephthalate.

According to this invention, such a thermoplastic resin is melted in an extruder, and extruded in film from from a die slit onto a rotating cooling drum. In order to extrude the molten polymer at a fixed rate from the die slit, it is desirable to provide a metering pump before the die. A static mixer or the like may also be provided before the die in order to knead the feed stock as uniformly as possible or to maintain as uniform a temperature distribution as possible. It is preferred to use a die which is divided into small sections which are locally temperature-controllable. There can also be used a die of the structure in which the width of the die can be mechanically increased or decreased locally.

The molten polymer extruded through the die slit is received on the cooling drum and cooled there.

Desirably, a known electrostatic pinning method is used to bring the film-like extrudate electrostatically into intimate contact with the cooling drum. An air knife or the like may of course be used to achieve intimate contact.

The unstretched film so obtained on the cooling drum whose variation rate (%) of instantaneous rotation under no load is adjusted to less than 1% is then withdrawn so that no tension in the stretching step is exerted on the film placed on the cooling drum. The withdrawn film is then stretched in the subsequent stretching step.

In the stretching step, the film is stretched in the longitudinal (machine) direction, and if desired, further in the widthwise direction. Known stretching, heat-treating, cooling and take-up devices can be used in the process of this invention.

As described more specifically in the following Examples, according to the process of this invention, thermoplastic resin films having markedly reduced thickness unevenness can be commercially advantageously produced by a film-forming apparatus which operates at high speeds. In the process of this invention, the stretched film may, if desired, be heat-treated. Under heat-treating temperature conditions customarily used for the individual thermoplastic resins, scarcely any increase in thickness unevenness is noted in the stretched film of reduced thickness unevenness obtained by the process of this invention. Accordingly, the process of this invention may also comprise a heat-treating step.

The following Examples further illustrate the present invention.

EXAMPLE 1

A water-cooled cooling drum having a diameter of 634 mm and a drum width of 1000 mm was directly connected to a 3.7 KW dc motor equipped with a 100% regenerative brake which was adapted for control by a thyristor-Leonade control system, and was driven. Under no load, the variation rate of instantaneous rotation of this cooling drum was 0.8%.

The cooling drum was rotated at a peripheral speed of 20 m/min. An unsolidified extruded polyethylene terephthalate film was brought into intimate contact with the cooling drum by applying an electrostatic charge to it through a wire electrode from a 6.0 KV d.c. power supply. The resulting film (unstretched) had an average thickness of 300 μm. When the film was longitudinally stretched so that it was taken up from the cooling drum under tension, the variation rate of instantaneous rotation of the cooling drum increased to 20%, and the range of variation in thickness (the difference between the maximum thickness and the minimum thickness) per meter of the unstretched film was 5 μm.

In contrast, when the film was taken up from the cooling drum after providing loosening in it so that that part which was between the cooling drum and a stretcher sagged to about 300 mm per meter of span, the variation rate of instantaneous rotation of the cooling drum was 0.9%, and the range of variations in thickness of the unstretched film was 1.7 μm.

EXAMPLE 2

A water-cooled cooling drum having a diameter of 634 mm and a width of 500 mm was directly connected to a dc torque motor adapted for control by a transistor PWM method and having a maximum output of 2.6 KW, and driven. Under no load, the rate variation rate of instantaneous rotation of the cooling drum was 0.4%.

The cooling drum was rotated at a peripheral speed of 30 m/min., and an electrostatic charge was applied to the molten polymer immediately before adhesion to the cooling drum by a wire electrode to which a dc voltage of 6.5 KV had been applied.

As the thermoplastic resin, polyethylene-2,6-naphthalene-dicarboxylate was melted at 290° C., and extruded from a die slit with a clearance adjusted to 0.5 mm to form an untreated film having an average thickness of 170 μm. When the unstretched film was continuously fed under tension to a transverse stretcher, the variation rate of instantaneous rotation of the cooling drum was 3%, and the range of a variation in thickness per meter of the unstretched film was 4 μm.

A tension stabilizing device consisting of two free rolls and one dancer roll and two free rolls following them was introduced between the cooling drum and the transverse stretcher. The film was fed from the cooling drum to the stretcher through this stabilizing device. The dancer roll was adapted to move up and down, and a load was exerted by an air cylinder. A flywheel having a weight of 50 kg was secured to the second free roll. A brake torque was applied to the third free roll by a powder brake.

At this time, the variation rate of instantaneous rotation of the cooling drum was 0.6%, and the range of a variation in film thickness at the unstretched part was 1 μm.

EXAMPLE 3

A water-cooled cooling drum having a diameter of 634 mm and a width of 500 mm was driven by a dc servomotor (controlled by a transistor PWM method, rated output 2.6 W) while decelerating the rotation of the motor by a flat belt (the deceleration ratio ½).

Under no load, the variation rate of instantaneous rotation of the cooling drum was 0.6%.

The cooling drum was rotated at a pheripheral speed of 20 m/min., and an electrostatic charge was applied to the film-like extrudate immediately before adhesion to the cooling drum by a wire electrode to which a dc voltage of 6.0 KV had been applied.

As the thermoplastic resin, polyethylene terephthalate was melted at 280° C., and extruded from a die with a clearance adjusted to 0.5 mm. Thus, an unstretched film having an average thickness of 300 microns was obtained.

When the unstretched film was fed into a windup device continuously under tension, the variation rate of instantaneous rotation of the cooling drum became 2%, and the range of a variation in thickness (the difference between the maximum thickness and the minimum thickness) per meter of the unstretched film was 5 microns.

The film between the cooling drum and the wind-up device was nipped with nip rolls with one axis kept at a fixed speed. The variation rate of instantaneous rotation of the cooling drum was 0.8% which was substantially the same as in the case of no load, and the range of variation in thickness of the unstretched film could be decreased to 1.6 microns.

The control of the speed of the nip roll was performed by using a dc servomotor (controlled by a transistor PWM method, equipped with 100% brake; rated output 1.5 KW), and decelerating its rotation by a flat belt (the deceleration ration 1/50).

What we claim is:

1. In a process for producing a film of a thermoplastic resin which comprises extruding a molten thermoplastic resin in film form onto a rotating cooling drum through a die slit, cooling the film-like extrudate on the cooling drum, withdrawing the cooled film-like extrudate from the cooling drum, and then stretching it, the improvement wherein the rotation of the cooling drum is controlled such that the variation rate (%) of instantaneous rotation under no load defined by the following $$\frac{\text{(Maximum instantaneous rotating speed)} - \text{(Minimum instantaneous rotating speed)}}{\text{Average rotating speed}} \times 100$$

is less than about 1%, and wherein said withdrawal of the cooled film-like extrudate is carried out so that substantially no tension in the subsequent stretching step is exerted on the film-like extrudate on the cooling drum.

2. The process of claim 1 wherein said withdrawal of the cooled film-like extrudate is carried out while it is loosened between said cooling and said stretching.

3. The process of claim 1 wherein said withdrawal of the cooled film-like extrudate is carried out by passing it over at least two free rolls and at least one dancer roll provided between said cooling and said stretching.

4. The process of claim 1 wherein said withdrawal of the cooled film-like extrudate is carried out by passing it through nip rolls of controlled speed provided between said cooling and said stretching.

* * * * *